(12) United States Patent
Shin et al.

(10) Patent No.: US 8,467,145 B1
(45) Date of Patent: Jun. 18, 2013

(54) SPINDLE MOTOR

(75) Inventors: Hyun Ho Shin, Gyunggi-do (KR); Chang Jo Yu, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/422,660

(22) Filed: Mar. 16, 2012

(30) Foreign Application Priority Data

Dec. 23, 2011 (KR) .................. 10-2011-0141670

(51) Int. Cl.
*G11B 17/00* (2006.01)
(52) U.S. Cl.
USPC ........................................ 360/99.08
(58) Field of Classification Search
USPC ........................................ 360/99.08
See application file for complete search history.

(56) References Cited

U.S. PATENT DOCUMENTS

| | | | |
|---|---|---|---|
| 6,380,651 B1 | 4/2002 | Yamaguchi et al. | |
| 6,768,236 B2* | 7/2004 | Tokunaga et al. | 310/90 |
| 6,890,104 B2* | 5/2005 | Gomyo et al. | 384/119 |
| 7,015,611 B2* | 3/2006 | Tokunaga et al. | 310/90 |
| 7,193,811 B2* | 3/2007 | Leuthold et al. | 360/99.08 |
| 7,758,246 B2* | 7/2010 | Aiello et al. | 384/107 |
| 8,169,738 B1* | 5/2012 | Yawata et al. | 360/99.08 |
| 8,238,055 B2* | 8/2012 | Kim et al. | 360/99.08 |
| 8,300,355 B2* | 10/2012 | Yang | 360/99.08 |
| 2004/0075939 A1* | 4/2004 | Aiello et al. | 360/99.08 |
| 2005/0099722 A1* | 5/2005 | Nishimura et al. | 360/99.08 |
| 2005/0140227 A1* | 6/2005 | Kuwert | 310/90 |
| 2005/0207060 A1* | 9/2005 | Leblanc et al. | 360/99.08 |
| 2007/0145837 A1* | 6/2007 | Herndon et al. | 310/67 R |
| 2007/0206890 A1* | 9/2007 | Kim | 384/119 |
| 2011/0299193 A1* | 12/2011 | Sekii et al. | 360/99.08 |

FOREIGN PATENT DOCUMENTS

JP 2006-211795 8/2006

* cited by examiner

*Primary Examiner* — Allen T Cao

(57) ABSTRACT

There is provided a spindle motor. The spindle motor includes a fixed member; and a rotating member rotating relatively to the fixed member, and having oil filling a bearing clearance formed between the fixed member and the rotating member, wherein the fixed member and the rotating member are provided with an oil diffusion path communicating an air/oil interface formed at a boundary between the oil filled in the bearing clearance and air with the outside, and at least one of the fixed member and the rotating member is provided with at least one dummy oil groove opened to the oil diffusion path and having oil filled in at least a portion of the inside thereof.

10 Claims, 8 Drawing Sheets

SPINDLE MOTOR

CROSS-REFERENCE TO RELATED APPLICATIONS

This application claims the priority of Korean Patent Application No. 10-2011-0141670 filed on Dec. 23, 2011, in the Korean Intellectual Property Office, the disclosure of which is incorporated herein by reference.

BACKGROUND OF THE INVENTION

1. Field of the Invention

The present invention relates to a spindle motor.

2. Description of the Related Art

A hard disk drive (HDD), an information storage device, reads data stored on a disk or writes data to a disk using a read/write head.

The hard disk drive requires a disk driving device capable of driving the disk. In the disk driving device, a small-sized spindle motor is used.

The small-sized spindle motor has included a fluid dynamic bearing assembly. A lubricating fluid is interposed between a rotating member and a fixed member of the fluid dynamic bearing assembly, such that a shaft is supported by fluid pressure generated in the lubricating fluid.

In addition, in the spindle motor adopting the fluid dynamic bearing assembly, the lubricating fluid (oil) forms an air/oil interface at a boundary with air due to surface tension and a capillary phenomenon. A sealing part of the fluid is formed by using the air/oil interface.

However, oil may be leaked to the outside due to other factors and oil may be scattered by being diffused according to a concentration gradient of oil generated by a mole fraction difference. Therefore, a need exists for a method for reducing an amount of oil leaked due to diffusion.

RELATED ART DOCUMENT (Patent Document 1) U.S. Pat. No. 6,380,651.
(Patent Document 2) Japanese Patent Laid-Open Publication No. 2006-211795.

SUMMARY OF THE INVENTION

An aspect of the present invention provides a motor structure capable of preventing oil from being leaked due to an oil diffusion phenomenon according to a concentration gradient of oil generated by a mole fraction difference.

According to an aspect of the present invention, there is provided a spindle motor, including: a fixed member; and a rotating member rotating relatively to the fixed member, and having oil filling a bearing clearance formed between the fixed member and the rotating member, wherein the fixed member and the rotating member are provided with an oil diffusion path communicating an air/oil interface formed at a boundary between the oil filled in the bearing clearance and air with the outside, and at least one of the fixed member and the rotating member is provided with at least one dummy oil groove opened to the oil diffusion path and having oil filling at least a portion of the inside thereof.

The dummy oil groove may be provided to have an annular shape in a circumferential direction.

The dummy oil groove may have an inclined side so that a width of a cross section thereof is increased in a direction from a bottom of the dummy oil groove toward the oil diffusion path.

The spindle motor may further include at least one communication hole communicating the dummy oil groove with an outside, wherein the communication hole is sealed with a cap.

The cap may be detachable.

The dummy oil groove may be opened to a portion at which the oil diffusion path is formed of a labyrinth seal.

Oil filling the dummy oil groove may be the same as the oil filling the bearing clearance.

The rotating member may include a shaft.

The fixed member may include a shaft.

According to another aspect of the present invention, there is provided a hard disk drive, including: the spindle motor as described above, the spindle motor coupled with a housing to rotate a disk; a magnetic head writing data to and reading the data from the disk; and a head transfer part moving the magnetic head to a predetermined position on the disk through electromagnetic interaction between a magnet and a coil.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
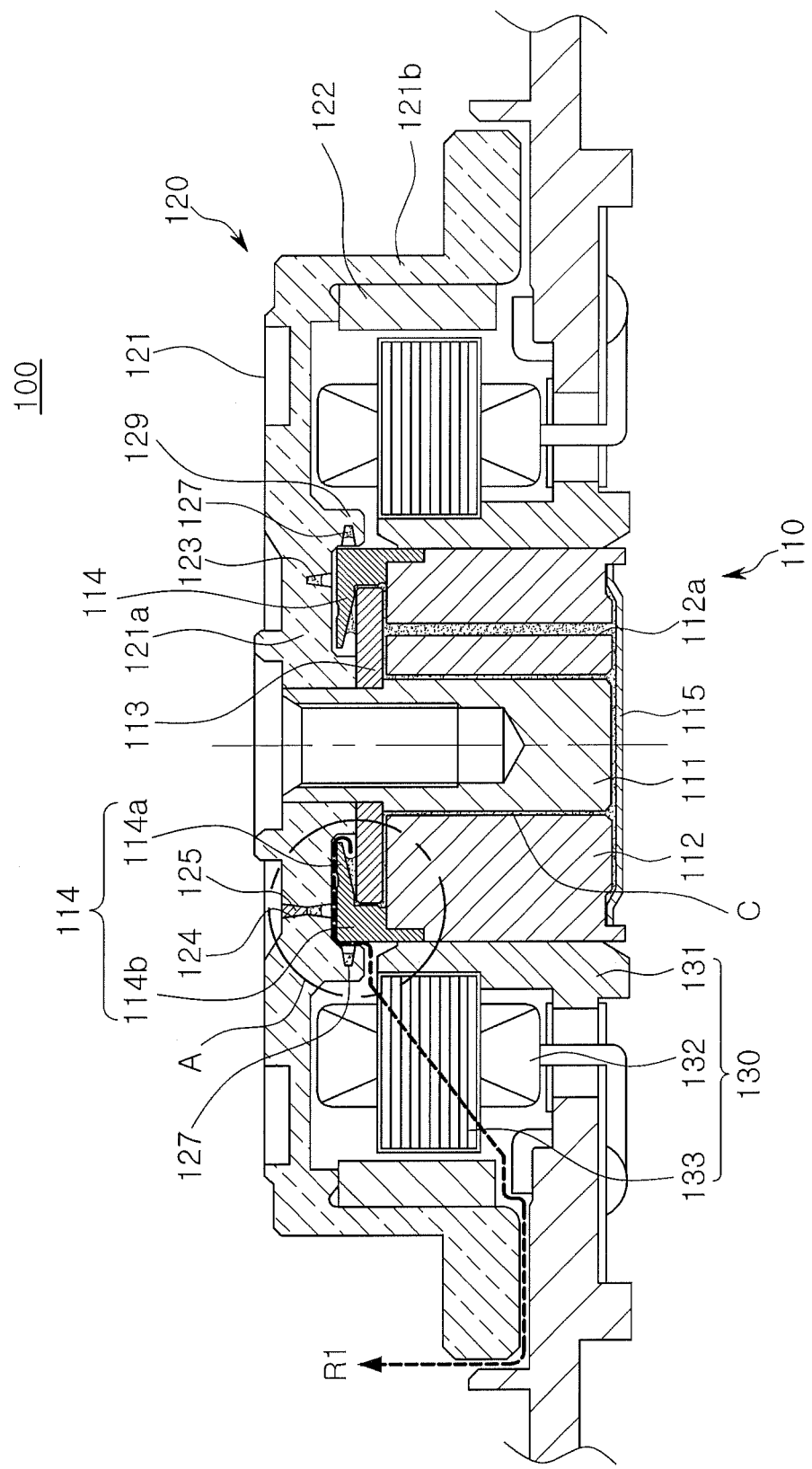
FIG. 1 is a cross-sectional view schematically showing a motor according to an embodiment of the present invention.

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, like reference numerals will be used to designate like components having similar functions throughout the drawings within the scope of the present invention.

Figure 2:
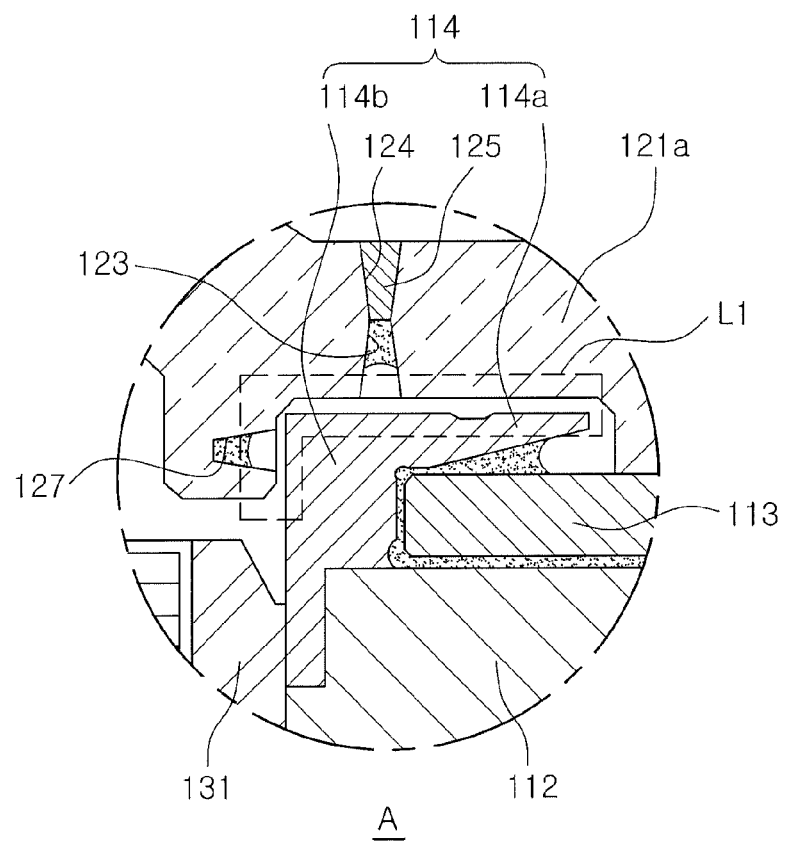
FIG. 2 is an enlarged view of portion A of FIG. 1.
Figure 3:
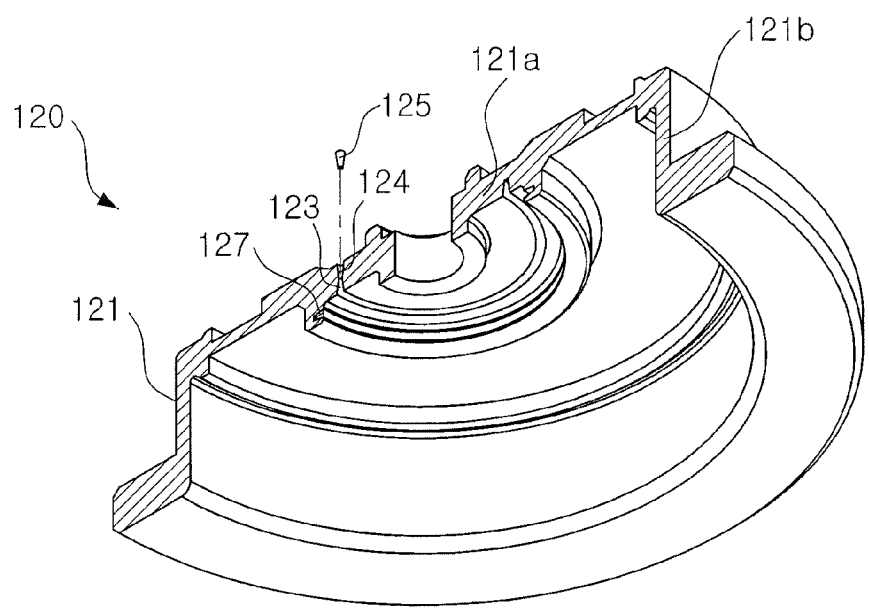
FIG. 3 is a cross-sectional perspective view schematically showing a rotor in a motor according to an embodiment of the present invention.

FIG. 1 is a cross-sectional view schematically showing a motor according to an embodiment of the present invention, FIG. 2 is an enlarged view of portion A of FIG. 1, and FIG. 3 is a cross-sectional perspective view schematically showing a rotor in a motor according to an embodiment of the present invention.

Referring to FIGS. 1 to 3, a motor 100 including a fluid dynamic bearing assembly 110 according to an embodiment of the present invention may include a fluid dynamic bearing assembly 110 including a thrust plate 113 and a cap member 114, a stator 130 including a core 131 having a coil 132 wound therearound, and a rotor 120 including a rotor case 121.

Hereinafter, the above configuration will be described in detail.

The fluid dynamic bearing assembly 110 may include a shaft 111, a sleeve 112, a thrust plate 113, and a cap member 114.

First, terms with respect to directions will be first defined. As viewed in FIG. 1, an axial (axially) direction refers to a vertical direction based on the shaft 111, and a radially outer or inner direction refers to a direction towards an outer end of the rotor 120 based on the shaft 111 or a direction towards a center of the shaft 111 based on the outer end of the rotor 120.

Further, a rotating member described below may be a rotating member including a rotor 120 including the shaft 111, a thrust plate 113, a rotor case 121, and a magnet 122 mounted thereon, or the like, and the fixed member may be a member other than the rotating members. For example, the fixed member may be relatively fixed members, for example, such as the sleeve 112, the stator 130, a base, or the like, as compared with the rotating members.

The sleeve 112 may support the shaft 111 so that a top end of the shaft 111 is protruded axially upwardly, and may be formed by forging Cu or Al or sintering Cu—Fe-based alloy powders or SUS-based powders.

Here, the shaft 111 may be inserted into a shaft hole of the sleeve 112 so as to have a bearing clearance C therebetween. The bearing clearance C may be filled with oil that is the lubricating fluid, and the rotation of the rotor 200 may be more smoothly supported by a radial dynamic groove formed in at least one of an outer circumferential surface of the shaft 111 and an inner circumferential surface of the sleeve 120.

The radial dynamic groove may be formed in an inner peripheral surface of the sleeve 112 that is the inside of the shaft hole of the sleeve 112 and may form pressure so that the shaft 111 is smoothly rotated at a predetermined distance from the inner side of the sleeve 112 at the time of the rotation of the shaft 111.

However, the radial dynamic groove is not necessarily formed in the inner peripheral surface of the sleeve 112 as described above but may also be formed in an outer circumferential portion of the shaft 111. In addition, the number of radial dynamic grooves is not limited.

The sleeve 112 may include a bypass channel 112a formed therein in order to allow top and bottom portions of the sleeve 112 to communicate with each other, such that pressure of oil that is the lubricating fluid in a fluid dynamic bearing assembly 110 is dispersed, thereby equalizing the pressure, and may move bubbles, or the like, present in the fluid dynamic bearing assembly 110 so as to be discharged by circulation.

A cover plate 115 may be coupled with the bottom portion of the sleeve 112, keeping the bearing clearance C therebetween while accommodating the lubricating fluid, oil, in the bearing clearance C.

The cover plate 115 may serve as a bearing supporting a bottom portion of the shaft 111 in the state in which the clearance between the cover plate 150 and the sleeve 112 is filled with the lubricating fluid.

The thrust plate 113 may be disposed on the top portion of the sleeve 120 in an axial direction and includes a hole formed in the center thereof, wherein the hole corresponds to a cross section of the shaft 111. Meanwhile, the shaft 110 may be inserted into this hole.

Here, the thrust plate 113 may be separately fabricated and then coupled to the shaft 111. However, the thrust plate 130 may be integrally formed with the shaft 111 at the time of fabrication thereof and may rotate together with the shaft 111 at the time of the rotation of the shaft 111.

In addition, the bottom surface of the thrust plate 113 may be provided with a thrust dynamic groove providing thrust dynamic pressure to the shaft 111.

The thrust dynamic groove is not necessarily formed in the bottom surface of the thrust plate 113 as described above but may also be formed in the top surface of the sleeve 112 corresponding to the bottom surface of the thrust plate 113.

The cap member 114 is a member that is press-fitted on the top portion of the thrust plate 113 to seal the lubricating fluid between the cap member 114 and the thrust plate 113.

The cap member 114 may include a horizontal part 114a disposed above the thrust plate and a vertical part 114b downwardly extending from an outer edge of the horizontal part 114a. That is, an inner peripheral surface of the vertical part 114b is press-fitted in an outer peripheral surface of the sleeve 112 or may be bonded thereto by an adhesive.

A bottom surface of the cap member 114 facing the thrust plate 113 may be provided in a tapered shape in order to seal the lubricating fluid, which uses a capillary phenomenon and a surface tension of the lubricating fluid in order to prevent the lubricating fluid from being leaked to the outside at the time of driving of the motor.

The stator 130 may include a coil 132, a core 133, and a base member 131.

In other words, the stator 130 may be a fixed structure including the coil 132 generating electromagnetic force having a predetermined magnitude at the time of application of power and a plurality of cores 133 having the coil 132 wound therearound.

The core 133 may be fixedly disposed above a base member 131 including a printed circuit board (not shown) having pattern circuits printed thereon, a plurality of coil holes having a predetermined size may be formed in portions of the base member 310 corresponding to the winding coil 132 to penetrate through the base member 131 so as to expose the winding coil 132 downwardly and the winding coil 132 may be electrically connected to the printed circuit board (not shown) so that external power is supplied thereto.

An outer peripheral surface of the sleeve 112 may be press-fitted into the base member 131 and the core 133 having the coil 132 wound therearound may be inserted into the base member 131. In addition, the base member 310 and the sleeve 112 may be assembled with each other by applying an adhesive to an inner surface of the base member 310 or an outer surface of the sleeve 120.

The rotor 120, a rotational structure rotatably provided with respect to the stator 130, may include a rotor case 121 having an annular ring shaped magnet 122 provided on an outer peripheral surface thereof, wherein the annular ring shaped magnet 122 is located to correspond to the core 133, having a predetermined interval therebetween.

In addition, as the magnet 122, a permanent magnet generating magnetic force having a predetermined strength by alternately magnetizing an N pole and an S pole in a circumferential direction may be used.

Here, the rotor case 121 may include a hub base 121a press-fitted into the top end of the shaft 111 to thereby be fixed thereto and a magnet support part 121b extending from the hub base 121a in an outer diameter direction and bent axially downwardly to thereby support the magnet 122.

Meanwhile, according to the embodiment of the present invention, a member for preventing oil that is the lubricating fluid from being scattered or leaked due to the diffusion at an oil interface may be used.

Figure 9A:
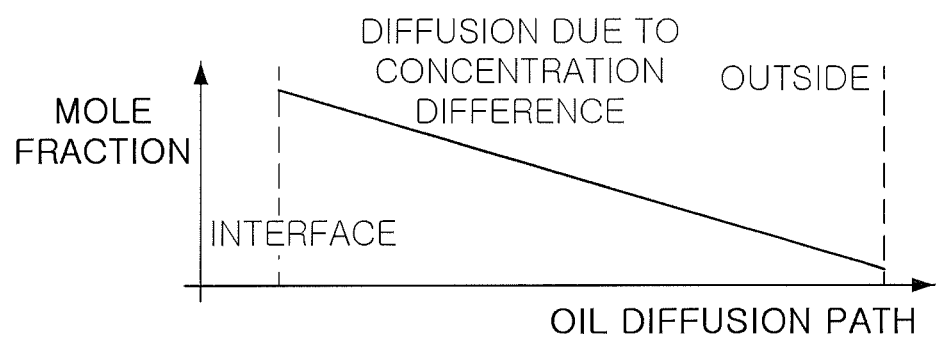
FIGS. 9A and 9B are graphs showing a mole fraction of a lubricating fluid in an oil diffusion path in the motor according to the embodiment of the present invention.
Figure 9B:
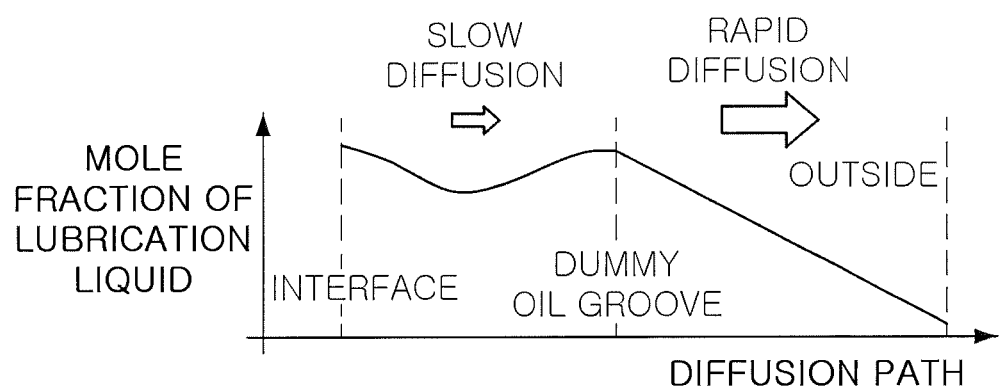

Referring to FIGS. 9A and 9B, when a separate member for preventing the diffusion of oil is not provided, as shown in FIG. 9A, the concentration gradient of oil is approximately linearly reduced from the air/oil interface to the outside, thereby continuing to leak the oil due to the diffusion.

Therefore, in the embodiment of the present invention, at least one dummy oil groove 123 filled with oil may be provided in an oil diffusion path R1 communicating the air/oil interface with the outside, wherein the air/oil interface is formed at the boundary between the oil filling the bearing clearance C and air. That is, at least one of the fixed member and the rotating member forming the oil diffusion path R1 may be provided with at least one dummy oil groove 123 having oil filling at least a portion of the inside thereof, while the dummy oil groove 123 is opened to the oil diffusion path R1.

When the dummy oil groove 123 opened to the oil diffusion path R1 to further diffuse oil is provided, as shown in FIG. 9B, the concentration gradient of oil may be reduced from the air/oil interface to a portion at which the dummy oil groove 123 is positioned and then increased. The concentration gradient of oil may be linearly reduced to the outside after the oil passes through the portion at which the dummy oil groove 123 is positioned, and therefore, scattering or the leak of the oil filling the bearing clearance C of the motor may be generated after the oil filling the dummy oil groove 123 is completely scattered or leaked, thereby effectively preventing the oil filling the bearing clearance C from being leaked due to the diffusion.

Herein, the dummy oil groove 123 may be provided to have an annular shape in a circumferential direction. As shown in FIG. 3, the dummy oil groove 123 is provided in a direction corresponding to a front of the air/oil interface by filling the dummy oil groove 123 provided in the annular shape along the circumferential direction, with oil, thereby effectively preventing oil from being scattered.

Further, the dummy oil groove 123 may have an inclined side so that a width of a cross section thereof is increased in a direction from the bottom portion of the dummy oil groove 123 toward the oil diffusion path. That is, the dummy oil groove 123 may have an inclined side so that the width of the cross section thereof is increased outwardly from the bottom portion of the dummy oil groove 123. This may effectively generate the capillary phenomenon, thereby precisely sealing oil.

Further, the dummy oil groove 123 may be opened to a portion at which the oil diffusion path R1 is formed of a labyrinth seal L1. The oil diffusion path R1 may be formed by various members (fixed member and rotating member) and a diameter thereof may be various according to the mounted position thereof. That is, a size of the cross section of the oil diffusion path R1 may be various according to the structure of the motor. Therefore, the dummy oil groove 123 provided in terms of preventing oil from being diffused due to the mole fraction difference may be formed to be positioned at a portion at which the size of the cross section of the oil diffusion path R1 is relatively small, thereby effectively preventing oil from being diffused.

In addition, the oil filling the dummy oil groove 123 may be the same as the oil filling the bearing clearance C. However, the embodiment of the present invention is not limited thereto. Therefore, various kinds of oil may be used for embodiments of the present invention.

Meanwhile, at least one communication hole 124 communicating between the dummy oil groove 123 and the outside may be provided and the communication hole 124 may be sealed by the cap 125. That is, when the oil filling the dummy oil groove 123 may be completely diffused, the communication hole 124 may be provided as a member for further refilling oil. Further, the communication hole 124 may be sealed with the detachable cap 125 so as to be repeatedly used.

Although the embodiment of the present invention discloses the case in which the dummy oil groove 123 is provided in the rotor 120, the position at which the dummy oil groove 123 is provided is not limited thereto. Therefore, the oil diffusion path R1 may be provided at any position. For example, as shown by a dotted line in FIGS. 1 and 2, a dummy oil groove 127 may be provided to be opened between the outer peripheral surface of the vertical part 114b of the cap member 114 and a main wall part 129. Further, the dummy oil groove 127 may be provided in any member regardless of the rotating member and the fixed member. FIGS. 1 and 2 show that the dummy oil groove 123 is formed in the rotor 120 that is the rotating member, but is not limited thereto. Therefore, the dummy oil groove 123 may also be formed in the cap member 114 opposed thereto.

Further, FIGS. 1, 2 and 3 show that a length direction of the dummy oil groove 125 is provided to be perpendicular to a diffusion direction of the oil diffusion path R1, but is not limited thereto. Therefore, the dummy oil groove 125 may be provided to have an inclined shape to the oil diffusion path R1 (see FIG. 4 or 5).

Figure 4:
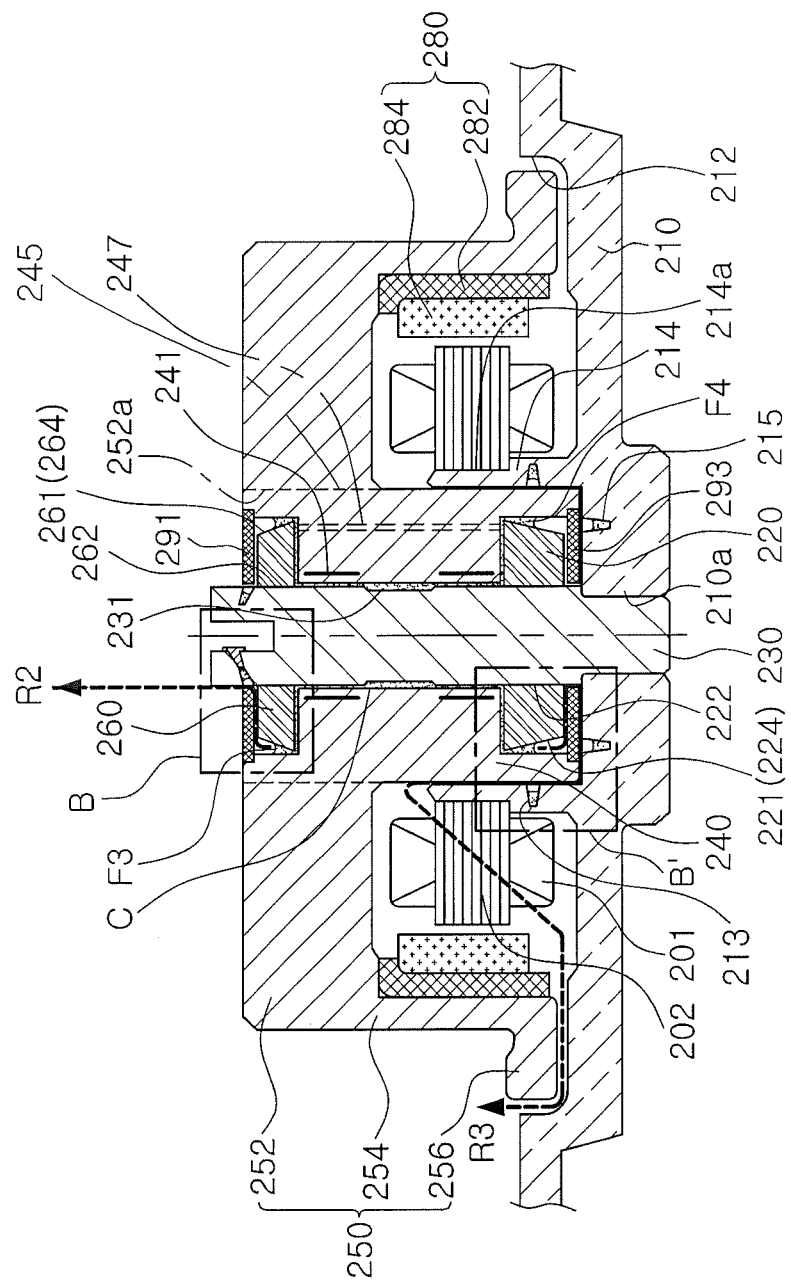
FIG. 4 is a cross-sectional view schematically showing a motor according to another embodiment of the present invention.
Figure 5A:
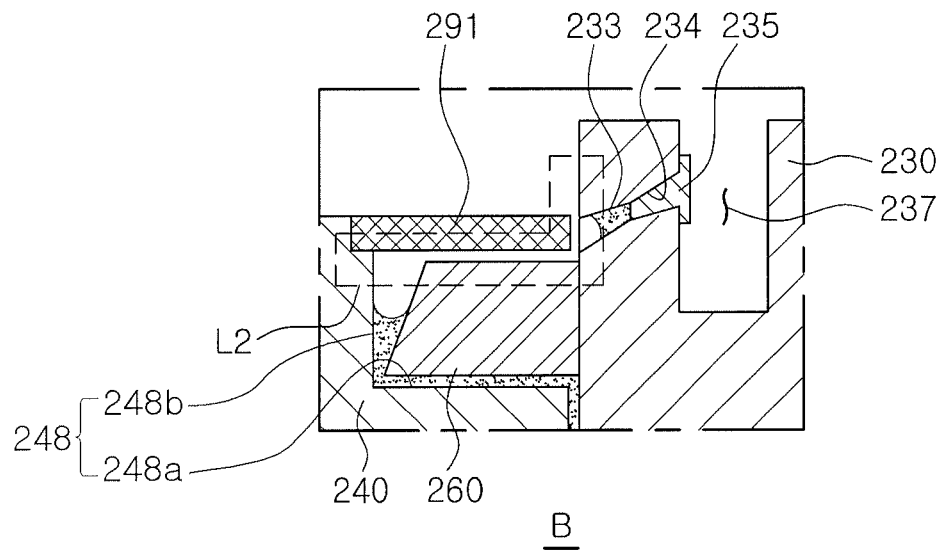
FIGS. 5A and 5B are an enlarged view of portions 'B' and 'B'' of FIG. 4.
Figure 5B:
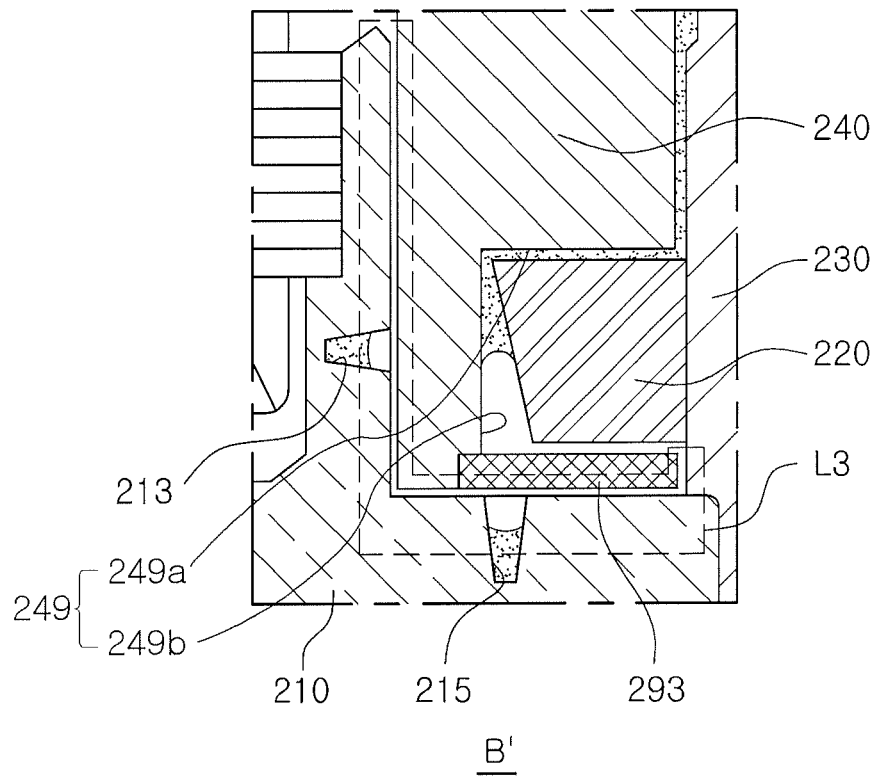
Figure 6:
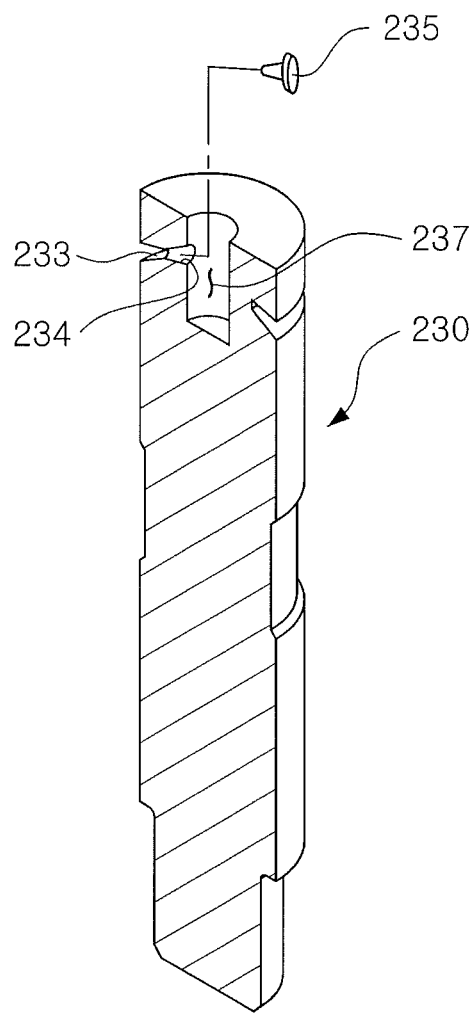
FIG. 6 is a perspective view schematically showing a shaft in the motor according to another embodiment of the present invention.

FIG. 4 is a cross-sectional view schematically showing a motor according to another embodiment of the present invention, FIG. 5 is an enlarged view of portions 'B' and 'B'' of FIG. 4, and FIG. 6 is a perspective view schematically showing a shaft in the motor according to another embodiment of the present invention.

Referring to FIGS. 4 to 6, a spindle motor 200 according to another embodiment of the present invention may include a base member 210, a lower thrust member 220, a shaft 230, a sleeve 240, a rotor hub 250, and an upper thrust member 260.

Here, the fluid dynamic bearing assembly may include the shaft 230, the sleeve 240, upper and lower thrust members 260 and 220, and a rotor hub 250.

Here, terms with respect to directions will be defined. As viewed in FIG. 4, an axial direction refers to a vertical direction, that is, a direction from a lower portion of the shaft 230 toward an upper portion thereof or a direction from the upper portion of the shaft 230 toward the lower portion thereof, and as viewed in FIG. 4, a radial direction refers to a horizontal direction, that is, a direction from the shaft 230 toward an outer peripheral surface of the rotor hub 250 or from the outer peripheral surface of the rotor hub 250 toward the shaft 230, and a circumferential direction refers to a direction rotating along the circumference of a circle having a radius at a predetermined distance from the rotating center.

Further, the rotating member described to be below may be a rotating member including a sleeve 240, the rotor hub 250, a magnet 280 mounted thereon, or the like, and the fixed member may be a member other than the rotating members. For example, the fixed member may be relatively fixed members with regard to the rotating members, for example, such as the shaft 230, the upper and lower thrust members 260 and 220, the base member 210, or the like.

The base member 210 may include a mounting groove 212 so as to form a predetermined space together with the rotor hub 250. In addition, the base member 210 may include a coupling part 214 extending axially upwardly and having a stator core 202 installed on an outer peripheral surface thereof.

In addition, the coupling part 214 may include a seat surface 214a provided on the outer peripheral surface thereof so that the stator core 202 may be seated thereon. Further, the stator core 202 seated on the coupling part 214 may be disposed above the mounting groove 212 of the base member 210 described above.

The shaft 230 may be fixedly mounted on the base member 210. That is, the bottom end portion of the shaft 230 may be inserted into an installation hole 210a formed in the base member 210. In addition, the bottom end portion of the shaft 230 may be bonded to an inner surface of the base member 210 by an adhesive and/or welding. Therefore, the shaft 230 may be fixed.

Meanwhile, the shaft 230 may also be included in the fixed member, that is, the stator, together with the upper and lower thrust members 260 and 220 and the base member 210 to be described below.

Meanwhile, the top surface of the shaft 230 may be provided with a coupling unit, for example, a screw part having a screw screwed thereto so that a cover member (not shown) is fixedly installed thereto.

In addition, at least one of the outer peripheral surface of the shaft 230 and the inner peripheral surface of the sleeve 240 may be provided with top and bottom radial dynamic grooves 241 for forming the fluid dynamic pressure at the time of the rotation of the sleeve 240. Further, a reservoir part 231 in which the bearing clearance is wider than other portions may be provided between the top and bottom radial dynamic grooves 241.

The sleeve 240 may be rotatably installed on the shaft 230. To this end, the sleeve 240 may include a shaft support part provided as a through hole into which the shaft 230 is inserted. Meanwhile, when the sleeve 240 is installed on the shaft 230, the inner peripheral surface of the sleeve 240 and the outer peripheral surface of the shaft 230 may be disposed to be spaced apart from each other by a predetermined interval to thereby form the bearing clearance C therebetween. Further, the bearing clearance C may be filled with the lubricating fluid.

In addition, the sleeve 240 may be provided with top and bottom groove parts 248 and 249 in which the upper and lower thrust members 260 and 220 to be described below may be received. The top and bottom groove parts 248 and 249 may each be formed by bottoms 248a and 249a of the groove part and side walls 248b and 249b of the groove part. In the embodiment of the present invention, the term of bottoms of the groove part may refer to a surface vertically formed to an axial direction in the groove parts 248 and 249 and the term of side walls of the groove part may refer to a surface formed to be parallel with the axial direction.

In addition, the inner surface of the sleeve 240 may be provided with a radial dynamic groove 241 generating the fluid dynamic pressure via the lubricating fluid (oil) filling the bearing clearance C at the time of the rotation of the sleeve 240. That is, as shown in FIG. 4, the radial dynamic groove 241 may be provided at the top and bottom portions of the sleeve.

However, the radial dynamic groove is not limited to the formation thereof in the inner surface of the sleeve 240 but may also be formed in the outer peripheral surface of the shaft 230 and may be provided in various shapes such as herringbone, spiral, helical shapes, or the like.

Further, the sleeve 240 may further include a circulation hole 247 communicating between the top groove part 248 of the sleeve 240 and the bottom groove part 249 thereof. The circulation hole 247 may discharge bubbles included in the lubricating fluid of the bearing clearance C to the outside therethrough and may facilitate circulation of the lubricating fluid.

The rotor hub 250 may be coupled to the sleeve 240 to thereby rotate together with the sleeve 240.

The rotor hub 250 may include a rotor hub body 252 including an insertion part 252a formed therein, the insertion part 252a including the sleeve 240 inserted into an inner portion thereof, a mounting part 254 extending from an edge of the rotor hub body 252 and including a magnet assembly 280 mounted on an inner surface thereof, and an extension part 256 extending from an end of the mounting part 254 radially outwardly.

Meanwhile, an inner circumferential surface of the rotor hub body 252 may be bonded to an outer circumferential surface of the sleeve 240. That is, the inner circumferential surface of the rotor hub body 252 may be bonded to the bonding surface 245 of the sleeve 240 by an adhesive and/or welding. In addition, the inner circumferential surface of the rotor hub body 252 may also be press-fitted in the bonding surface 245 of the sleeve 240.

Therefore, the sleeve 240 may rotate together with the rotor hub 250 at the time of the rotation of the rotor hub 250.

In addition, the mounting part 254 may extend axially downwardly from the rotor hub body 152. Further, the magnet assembly 280 may be fixedly mounted on the inner surface of the mounting part 254.

Meanwhile, the magnet assembly 280 may include a yoke 282 fixedly mounted on the inner surface of the mounting part 254 and a magnet 284 mounted on an inner peripheral surface of the yoke 282.

The yoke 282 may serve to direct a magnetic field from the magnet 284 toward the stator core 202 to thereby increase magnetic flux density. Meanwhile, the yoke 282 may have a circular ring shape or have a shape in which one end portion thereof is bent so as to increase the magnetic flux density by the magnetic field generated from the magnet 284.

The magnet 284 may have an annular ring shape and be a permanent magnet generating a magnetic field having a predetermined strength by alternately magnetizing an N pole and an S pole in a circumferential direction.

Meanwhile, the magnet 284 may be disposed to face a leading end of the stator core 202 having a coil 201 wound therearound and generate driving force by electromagnetic interaction with the stator core 202 having the coil 201 wound therearound so that the rotor hub 250 may rotate.

That is, when power is supplied to the coil 201, the driving force rotating the rotor hub 250 may be generated by the electromagnetic interaction between the stator core 202 having the coil 201 wound therearound and the magnet 284 disposed to face the stator core 102, such that the rotor hub 250 may rotate together with the sleeve 240.

The upper thrust member 260 may be fixedly mounted on the top end portion of the shaft 230 and may form a top air/oil interface F3 together with the side wall 248b of the top groove part of the sleeve 240. The upper thrust member 260 may include an inner peripheral surface 262 bonded to the shaft 230 and an outer peripheral surface 264 forming the air/oil interface together with the side wall 248b of the top groove part. Here, the outer peripheral surface 264 may be formed to have a top inclined part 261 of which an outer diameter of the top portion is formed to be smaller than that of the bottom portion thereof.

Meanwhile, the thrust dynamic groove for generating thrust dynamic pressure may be formed in at least one of the bottom surface of the top upper thrust member 260 and the bottom surface 248a of the top groove part of the sleeve 240 disposed to face the bottom surface of the upper thrust member 260. In the embodiment of the present invention, when the circulation hole 247 is not provided in the sleeve 240, the thrust dynamic groove may include all kinds of the thrust dynamic grooves provided in a radial direction. For example, one or two or more thrust dynamic grooves may be provided in a radial direction. Meanwhile, in the embodiment of the present invention, when the circulation hole 247 is provided in the sleeve 240, the thrust dynamic groove may refer to only the thrust dynamic groove 243a provided in a radially inner side based on the circulation hole 247.

In addition, the upper thrust member 260 may include a top cap 291 provided with the top portion thereof, the top cap 291 serving as a sealing member preventing the lubricating fluid filling the bearing clearance C from being leaked upwardly. The top cap 291 may terminate the top groove part 248 at the top portion thereof in an axial direction to serve to prevent the lubricating fluid from being leaked due to the scattering through the top groove part 248. That is, the top cap 291 may be fixedly bonded to the side wall 248b of the top groove part of the sleeve 240 by a press-fit or adhesive coupling method, and the clearance between the shaft hole of the top cap 291 through which the shaft protrudes upwardly in an axial direction, and the shaft 230, may be relatively narrow to suppress the leaking of air containing the evaporated lubricating fluid to the outside, thereby suppressing the reduction in an amount of the lubricating fluid filling the top bearing clearance C.

The lower thrust member 220 may be fixedly mounted on the bottom end portion of the shaft 230 and may form a bottom air/oil interface F4 together with the side wall 249b of the bottom groove part of the sleeve 240. The lower thrust member 220 may include an inner peripheral surface 222 bonded to the shaft 230 and an outer peripheral surface 224 provided to form the air/oil interface together with the side wall 249b of the bottom groove part. Here, the outer peripheral surface 224 may be formed to have a bottom inclined part 221 of which an outer diameter of the bottom portion is formed to be smaller than that of the top portion thereof.

Meanwhile, the thrust dynamic groove generating the thrust dynamic pressure may be formed in at least one of the top surface of the lower thrust member 220 and the bottom surface 249a of the bottom groove part of the sleeve 240 provided to face the top surface of the lower thrust member 220. In the embodiment of the present invention, when the circulation hole 247 is not provided in the sleeve 240, the thrust dynamic groove may include all kinds of the thrust dynamic grooves formed in a radial direction. For example, one or two or more thrust dynamic grooves formed in a radial direction may be included therein. Meanwhile, in the embodiment of the present invention, when the circulation hole 247 is provided in the sleeve 240, the thrust dynamic groove may refer to only the thrust dynamic groove 243a formed in a radially inner side based on the circulation hole 247.

In addition, The lower thrust member 220 may include a bottom cap 293 provided with a bottom portion thereof, the bottom cap 293 serving as a sealing member preventing the lubricating fluid filling the bearing clearance C from being leaked downwardly.

The bottom cap 293 may terminate the bottom groove part 249 at the top portion thereof in an axial direction to serve to prevent the lubricating fluid from being leaked due to the scattering through the bottom groove part 249. That is, the bottom cap 293 may be fixedly adhered to the side wall 249b of the bottom groove part of the sleeve 240 by a press-fit or adhesive coupling method, and the clearance between the shaft hole of the bottom cap 293 through which the shaft protrudes downwardly, and the shaft 230, may be relatively narrow to suppress air containing the evaporated lubricating fluid from being leaked to the outside, thereby suppressing the reduction of the lubricating fluid filling the top bearing clearance C.

Meanwhile, according to another embodiment of the present invention, a member for preventing oil that is the lubricating fluid from being scattered or leaked due to the diffusion at the oil interface may be used.

Referring to FIGS. 9A and 9B, when a separate member for preventing the diffusion of oil is not provided, as shown in FIG. 9A, the concentration gradient of oil may be approximately linearly reduced from the air/oil interface to the outside, thereby continuing to leak the oil due to the diffusion.

Therefore, in another embodiment of the present invention, at least one of the dummy oil grooves 233 and 213 filled with oil may be provided in the oil diffusion paths R2 and R3 communicating between the air/oil interface and the outside, wherein the air/oil interface is formed at the boundary between the oil filling the bearing clearance C and air.

That is, at least one of the fixed member and the rotating member forming the oil diffusion paths R2 and R3 may be provided with at least one of the dummy oil grooves 233 and 213 having oil filling at least a portion of the inside thereof, while the dummy oil grooves 233 and 213 are opened to the oil diffusion paths R2 and R3.

Further, the embodiment of the present invention has a structure in which two air/oil interfaces are respectively formed on the top and the bottom, and therefore, two oil diffusion paths R2 and R3 may be formed. As a result, the dummy oil grooves 233 and 213 may be respectively provided in paths.

When the dummy oil grooves 233 and 213 opened to the oil diffusion paths R2 and R3 to further diffuse oil is provided, as shown in FIG. 9B, the concentration gradient of oil may be reduced from the air/oil interface to a portion at which the dummy oil grooves 233 and 213 are positioned and is then increased. The concentration gradient of oil may be approximately linearly reduced to the outside after the oil passes through the portion at which the dummy oil grooves 233 are 213 are positioned, and therefore, scattering or the leaking of the oil filling the bearing clearance C of the motor may be generated after the oil filling the dummy oil grooves 233 and 213 is completely scattered or leaked, thereby effectively preventing the oil filling the bearing clearance C from being leaked due to the diffusion.

Figure 7:
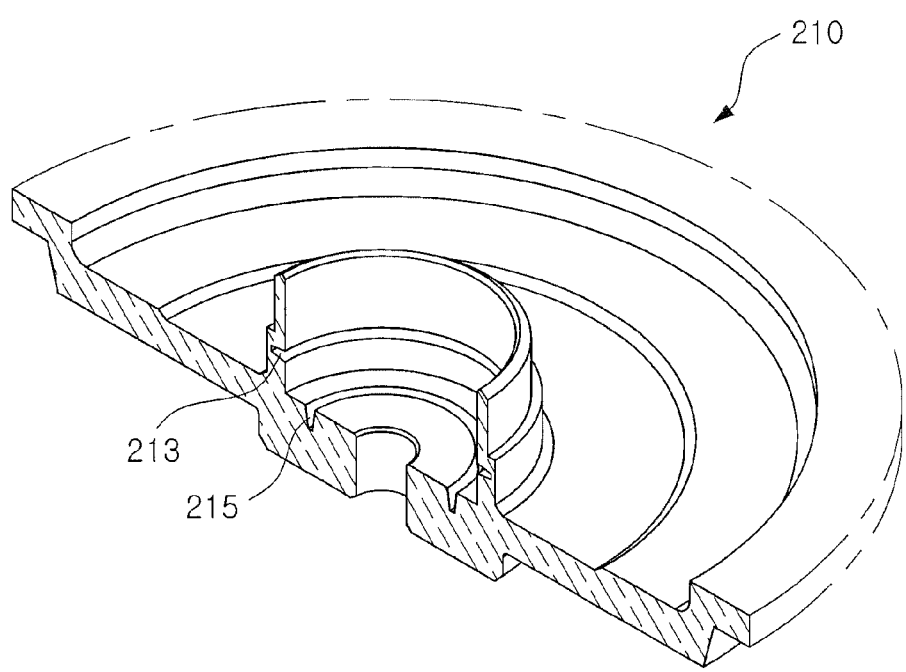
FIG. 7 is a perspective view schematically showing a base member in the motor according to another embodiment of the present invention.

Here, the dummy oil grooves 233 and 213 may be provided to have an annular shape in a circumferential direction. As shown in FIGS. 6 and 7, the dummy oil grooves 233 and 213 may be provided in a direction corresponding to a front of the air/oil interface by filling oil in the dummy oil grooves 233 and 213 provided in the annular shape along the circumferential direction, thereby effectively preventing oil from being scattered.

That is, the dummy oil grooves 233 and 213 may have inclined sides so that the width of cross sections thereof is increased from the inside to the outside thereof. This may effectively generate the capillary phenomenon, thereby precisely sealing oil.

Further, the dummy oil grooves 233 and 213 may be opened to a portion at which the oil diffusion paths R2 and R3 are formed of a labyrinth seal L2. The oil diffusion paths R2 and R3 may be formed of various members (fixed member and rotating member) and a diameter thereof may be various according to the mounted position thereof. That is, a size of cross sections of the oil diffusion paths R2 and R3 may be various according to the structure of the motor. Therefore, the dummy oil grooves 233 and 213 provided in terms of preventing oil from being diffused due to the mole fraction difference may be positioned at a portion at which the size of the cross sections of the oil diffusion paths R2 and R3 is relatively small, thereby effectively preventing oil from being diffused.

In addition, the oil filling the dummy oil groove 123 may be the same as the oil filling the bearing clearance C. However, the embodiment of the present invention is not limited thereto. Therefore, various kinds of oil may be used for the embodiment of the present invention.

Meanwhile, at least one communication hole 234 communicating between the dummy oil groove 233 and the outside may be provided and the communication hole 234 may be sealed with the cap 235. That is, when the oil filling the dummy oil groove 233 is completely consumed due to the diffusion, the communication hole 234 may be used as a member for further refilling oil. Further, the communication hole 234 may be sealed with the detachable cap 235 so as to be repeatedly used.

Although the embodiment of the present invention describes that the dummy oil grooves 233 and 213 are provided in the shaft 230 or the base member 210, the position at which the dummy oil groove is provided is not limited thereto. Therefore, the oil diffusion paths R2 and R3 may be provided at any position. For example, as shown by a dotted line FIGS. 4 and 5, the dummy oil groove 215 may be provided to be opened between the lower thrust member 293 and the base member 210. Further, the dummy oil groove 215 may be applied to any member regardless of the rotating member and the fixed member. Although the drawing shows the case in which the dummy oil grooves 233 and 213 are provided in the shaft 230 and the base member 210 that are the fixed members, the embodiment of the present invention is not limited thereto. Therefore, the dummy oil grooves 233 and 213 may also be formed in the upper thrust member 291, the lower thrust member 293, or the sleeve 240.

Further, as shown in the drawings, the dummy oil grooves 233 and 213 may be provided to be longitudinally inclined or vertical to the direction of the oil diffusion path R1.

Figure 8A:
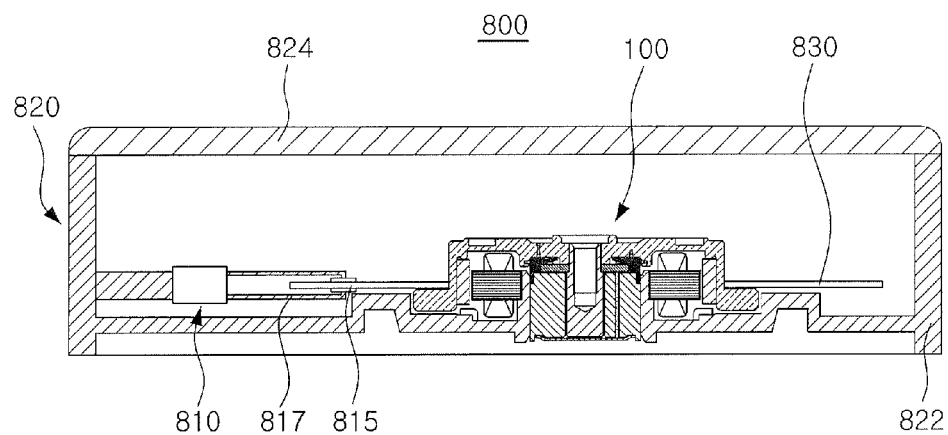
FIGS. 8A and 8B are a cross-sectional view schematically showing a disk driving apparatus using the motor according to the embodiment of the present invention.
Figure 8B:
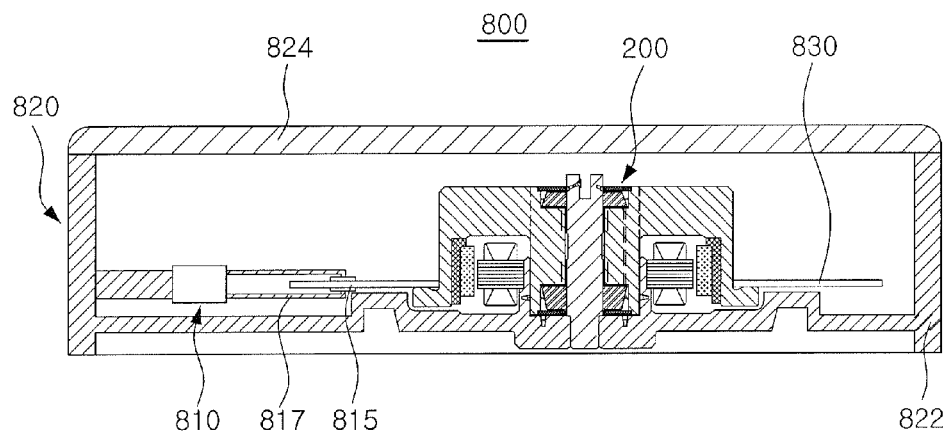

Referring to FIGS. 8A and 8B, a recording disk driving device 800 having the motors 100 or 200 according to the embodiment of the present invention mounted therein may be a hard disk driving device and may include the motor 100 or 200, a head transfer part 810, and a housing 820.

The motors 100 and 200 have all the characteristics of the motor according to the embodiment of the present invention described above and may have a recording disk 830 mounted thereon.

The head transfer part 810 may transfer a magnetic head 815 detecting information of the recording disk 830 mounted in the motors 100 and 200 to a surface of the recording disk of which the information is to be detected.

Here, the magnetic head 815 may be disposed on a support portion 817 of the head transfer part 810.

The housing 820 may include a motor mounting plate 822 and a top cover 824 shielding an upper portion of the motor mounting plate 822 in order to form an internal space receiving the motors 100 or 200 and the head transfer part 810.

As set forth above, according to the embodiments of the present invention, the motor capable of preventing oil from being leaked due to the diffusion phenomenon of oil according to the concentration gradient of oil generated by the mole fraction difference may be provided.

Further, according to the embodiments of the present invention, the above-mentioned defect may be solved by simplifying the structure using the diffusion principle, thereby manufacturing the motor without adding the separate manufacturing line.

While the present invention has been shown and described in connection with the embodiments, it will be apparent to those skilled in the art that modifications and variations can be made without departing from the spirit and scope of the invention as defined by the appended claims.

What is claimed is:

1. A spindle motor, comprising:
a fixed member; and
a rotating member rotating relatively to the fixed member, and having oil filling a bearing clearance formed between the fixed member and the rotating member,
the fixed member and the rotating member being provided with an oil diffusion path communicating an air/oil interface formed at a boundary between the oil filled in the bearing clearance and air with the outside of the spindle motor, and
at least one of the fixed member and the rotating member being provided with at least one dummy oil groove opened to the oil diffusion path and the dummy oil groove having oil filled in at least a portion of the inside thereof.

2. The spindle motor of claim 1, wherein the dummy oil groove is provided to have an annular shape in a circumferential direction.

3. The spindle motor of claim 1, wherein the dummy oil groove has an inclined side so that a width of a cross section thereof is increased in a direction from a bottom of the dummy oil groove toward the oil diffusion path.

4. The spindle motor of claim 1, further comprising at least one communication hole communicating the dummy oil groove with an outside of the spindle motor, wherein the communication hole is sealed with a cap.

5. The spindle motor of claim 4, wherein the cap is detachable.

6. The spindle motor of claim 1, wherein the dummy oil groove is opened to a portion at which the oil diffusion path is formed of a labyrinth seal.

7. The spindle motor of claim 1, wherein oil filled in the dummy oil groove is the same as the oil filled in the bearing clearance.

8. The spindle motor of claim 1, wherein the rotating member includes a shaft.

9. The spindle motor of claim 1, wherein the fixed member includes a shaft.

10. A hard disk drive, comprising:
a spindle motor of claim 1 coupled with a housing to rotate a disk;
a magnetic head writing data to and reading the data from the disk; and
a head transfer part moving the magnetic head to a predetermined position on the disk through electromagnetic interaction between a magnet and a coil.

* * * * *